UNITED STATES PATENT OFFICE.

BIRGER BRODTKORB, OF NOTODDEN, NORWAY, ASSIGNOR TO NORSK HYDRO-ELEKTRISK KVAELSTOFAKTIESELSKAB, OF CHRISTIANIA, NORWAY.

PRODUCTION OF AMMONIA FROM CYANAMID.

1,332,100.    Specification of Letters Patent.    Patented Feb. 24, 1920.

No Drawing.    Application filed September 4, 1918. Serial No. 252,554.

*To all whom it may concern:*

Be it known that I, BIRGER BRODTKORB, a subject of the King of Norway, residing at Notodden, in the Kingdom of Norway, have invented certain new and useful Improvements in the Production of Ammonia from Cyanamid; and I do hereby declare the following to be a full, clear, and exact description of the invention, such as will enable others skilled in the art to which it appertains to make and use the same.

In the production of ammonia from cyanamid by heating with water in autoclaves, it is well known that comparatively large quantities of sodium carbonate are added in order to obtain the largest possible yield of ammonia and to obtain a rapid and simultaneously calm and complete reaction. This addition of sodium carbonate represents a considerable cost because it is difficult to recover all the added sodium carbonate from the sludge coming from the autoclaves.

Another inconvenience that is very troublesome arises during the heating of the autoclaves, these autoclaves being heated by direct steam, which in entering the autoclave causes shocks of water and violent shaking of the apparatus.

I have found that these inconveniences may be limited to an essential degree by adding, at a higher temperature than heretofore customary, the water necessary for the process. Temperatures of 40° centigrade and more have a very favorable effect. All water shocks and vibrations practically cease.

The greatest advantage resides in being able to carry out the hydration process with a considerably reduced addition of sodium carbonate and at the same time obtain a uniform and complete initial reaction and operation in combination with a good yield.

In addition to the direct saving of sodium carbonate one obtains a reduction of the reaction period, or in other words, an increase in the producing capacity of the autoclaves, because practically all vibrations are avoided. The addition of steam may take place more rapidly, obtaining a more rapid increase of the pressure in the autoclaves. It will be understood that these advantages are of a great practical importance.

I claim—

The process of obtaining ammonia by the hydrolysis of cyanamid, which comprises heating the water for the hydrolysis to a temperature of at least 40° centigrade before it is brought into contact with the cyanamid.

In testimony that I claim the foregoing as my invention, I have signed my name in presence of two subscribing witnesses.

BIRGER BRODTKORB.

Witnesses:
  C. VORMAN,
  C. FABRICIUS HANSEN.